(12) United States Patent
Grubb et al.

(10) Patent No.: US 8,657,549 B2
(45) Date of Patent: Feb. 25, 2014

(54) LONG-TERM STORAGE SITE FOR RADIOACTIVE MATERIALS

(75) Inventors: Robert L. Grubb, Ellicott City, MD (US); Jayant R. Bondre, Clarksville, MD (US); Lise Wattez, Paris (FR)

(73) Assignees: Transnuclear, Inc., Columbia, MD (US); TN International, Montigny le Bretonneux (FR)

( * ) Notice: Subject to any disclaimer, the term of this patent is extended or adjusted under 35 U.S.C. 154(b) by 656 days.

(21) Appl. No.: 12/668,194

(22) PCT Filed: Jul. 8, 2008

(86) PCT No.: PCT/EP2008/058852
§ 371 (c)(1),
(2), (4) Date: Jun. 1, 2010

(87) PCT Pub. No.: WO2009/007367
PCT Pub. Date: Jan. 15, 2009

(65) Prior Publication Data
US 2010/0254785 A1 Oct. 7, 2010

(30) Foreign Application Priority Data
Jul. 10, 2007 (FR) .................................. 07 56383

(51) Int. Cl.
*G21C 19/07* (2006.01)
*G21C 19/32* (2006.01)
*G21F 5/012* (2006.01)
*G21F 5/14* (2006.01)

(52) U.S. Cl.
USPC ....... 414/146; 376/272; 414/404; 414/416.04

(58) Field of Classification Search
USPC .............. 414/146, 395, 404, 416.04; 376/272
See application file for complete search history.

(56) References Cited

U.S. PATENT DOCUMENTS 2,690,850 A * 10/1954 Welker ..................... 414/416.04
4,044,905 A * 8/1977 Liberman et al. ........ 414/416.04
(Continued)

FOREIGN PATENT DOCUMENTS

DE 3244727 A1 * 6/1984
JP 9-26497 A * 1/1997
(Continued)

OTHER PUBLICATIONS

International Preliminary Report on Patentability (English translation), mailed Jun. 17, 2010, issued in corresponding PCT/EP2008/058852, filed Jul. 8, 2008.

(Continued)

*Primary Examiner* — James Keenan
(74) *Attorney, Agent, or Firm* — Christensen O'Connor Johnson Kindness PLLC

(57) ABSTRACT

A long-term storage facility has an array of storage packages receiving respective cases containing radioactive materials. Each storage package has a lateral body delimiting a housing for receiving a case, the package body being closed at its top end and at its low end respectively by a removable head cover, and by a package base. The package base has a removable base cover, allowing insertion of the case via the low end of the body. The packages can be moved inside the facility by a mechanical lift. The facility includes a pivoting frame for swinging a storage package from a horizontal orientation in which the storage package is loaded to a vertical position in which the storage package is stored.

9 Claims, 11 Drawing Sheets

(56) References Cited

U.S. PATENT DOCUMENTS

| | | | |
|---|---|---|---|
| 4,055,508 A * | 10/1977 | Yoli et al. | 376/272 |
| 4,127,199 A * | 11/1978 | Clethero | 414/12 |
| 4,197,467 A * | 4/1980 | Williams | 250/506.1 |
| 4,390,040 A * | 6/1983 | Beyen | 137/340 |
| 4,498,011 A * | 2/1985 | Dyck et al. | 250/507.1 |
| 4,527,066 A * | 7/1985 | Dyck et al. | 250/507.1 |
| 4,780,269 A | 10/1988 | Fischer | |
| 5,406,600 A * | 4/1995 | Jones et al. | 376/272 |
| 6,625,246 B1 * | 9/2003 | Singh et al. | 376/261 |
| 6,793,450 B2 * | 9/2004 | Singh et al. | 414/146 |
| 7,068,748 B2 * | 6/2006 | Singh | 376/272 |
| 7,246,987 B2 * | 7/2007 | Jagos et al. | 414/754 |
| 2003/0194042 A1 | 10/2003 | Singh | |
| 2004/0017876 A1 * | 1/2004 | Stilwell et al. | 376/272 |

FOREIGN PATENT DOCUMENTS

| | | | |
|---|---|---|---|
| JP | 2003-287592 A * | 10/2003 | |
| JP | 2009-204515 A * | 9/2009 | |
| WO | 2007/017519 A1 | 2/2007 | |

OTHER PUBLICATIONS

International Search Report and Written Opinion dated Nov. 19, 2008, issued in corresponding International Application No. PCT/EP2008/058852, filed Jul. 8, 2008.

* cited by examiner

LONG-TERM STORAGE SITE FOR RADIOACTIVE MATERIALS

CROSS REFERENCE TO RELATED APPLICATIONS OR PRIORITY CLAIM

This application is a national phase of International Application No. PCT/EP2008/058852, entitled, "CONTAINER FOR LONG-TERM STORAGE WITH REMOVABLE BASE", which was filed on Jul. 8, 2008, and which claims priority of French Patent Application No. 07 56383, filed Jul. 10, 2007.

DESCRIPTION

1. Technical Field

This present invention generally relates to a long-term storage package for receiving a case containing radioactive materials, such as irradiated nuclear fuel assemblies, nuclear waste, etc.

The invention relates to a long-term storage site for radioactive materials, having an array of long-term storage packages each accommodating a case containing radioactive materials, and being stored in a vertical position with a removable head cover oriented upwards.

The invention also relates to a transfer process for a case containing radioactive materials, from transfer package to a long-term storage package.

2. Prior Art

When an assembly of nuclear fuel has been irradiated following its utilisation in a nuclear power plant, it can be placed in a sealed container known as a case prior to being stored over a long period, from forty to sixty years, for example in a storage site, also known as a long-term storage site.

To ensure transport of the case to the storage site, the case is first placed in a package known as transport package or transfer package, to form an assembly known as a parcel. The head of the case is then arranged at the top end of the transfer package. In fact, the operations firstly for loading the fuel assemblies into the case and secondly from the case into the transfer package, are carried out under water, in a pond, vertically. Since one cannot envisage turning the case over when the latter is loaded with the fuel assemblies, so that the head of the case is located at the bottom part, it is therefore impossible to insert the case into the transfer package with the head of the case oriented downwards.

Then the entire parcel is routed to the storage site where a transfer process is used to move this package case to a receiving housing. This receiving housing can be provided within long-term storage package, or even inside a concrete module such as is known from the document U.S. Pat. No. 4,780,269. This latter case is interesting in the sense that it offers a horizontal receiving housing, facilitating the transfer process of the case. In fact, it is usual to align the transfer package integrating the case with the receiving housing of the concrete module with both arranged horizontally, then to pull or push on this case to transfer it from its package housing to its assigned receiving housing. This transfer technique is also known from the document U.S. Pat. No. 4,780,269.

The major drawback to such a system is the fact that the horizontal transfer of the case in the housing of the concrete module is done with the head of the case oriented to the front in the direction of movement of the case, such that this case top is oriented at the base of the concrete module, once transfer is complete. Consequently, the head of the case, on which there is optionally cause to intervene during the long storage period inside the concrete module, becomes very difficult for operators to access.

OBJECT OF THE INVENTION

The chief aim of the invention therefore is to propose long-term storage package whereof the design eliminates the drawback mentioned hereinabove, relative to the realisations of the prior art.

To achieve this, the initial object of the invention is long-term storage package intended to receive a case containing radioactive materials, said package comprising a lateral body delimiting a housing for receiving the case, said package body being closed at its top end and at its low end respectively by a removable head cover, and by a package base. According to the invention, said package base takes the form of a removable base cover, allowing the insertion of the case, preferably horizontally, via the low end of said package body, with the head of the case oriented to the front in the direction of movement thereof.

This type of removable base cover enables the insertion of the case via the low end of the package body, with the head of the case oriented to the front in the direction of movement of the case. Consequently, once transfer of the case is complete, its head is arranged at the level of the top end of the storage package, making it particularly accessible for any possible intervention for handling/checking during the long storage period.

As mentioned above, the case located inside a transfer package with a fixed bottom can be loaded horizontally into the storage package of the invention, before the latter is pivoted so that it adopts a vertical, long-term storage position, with the head of the case located at the head of the package, by virtue of loading the case by the bottom of this package.

Also, the invention is of particular interest when it is intended to be utilised inside a long-term storage site, in which the storage packages are stored vertically so as to optimise the overall space. Advantageously, the invention also remains of particular interest when the vertical storage site has a limited height to lift hook, preventing any transfer of the case in a vertical direction, and this is whether the site is open at the top or closed at the top, as is the case for sites known as long-term storage facilities.

The storage package preferably comprises ventilation means allowing circulation of air between said case housing and the exterior of the package, with this air circulation used to collect and remove part of the heat given off by the radioactive materials contained in the case.

Furthermore, said package body has a thickness of at least 200 mm, for its physical protection. In this respect, it is noted that such long-term storage package does not need, as compared to transport/storage package, to satisfy the regulatory safety demands for the transport of nuclear materials on public routes, especially the particularly restrictive so-called freefall tests on synclastic target. However, the design of storage package must usually allow it to conserve the integrity of the case following an aircraft crash, followed by fire, or even during an earthquake.

Another object of the invention concerns a long-term storage site for radioactive materials, said site comprising a plurality of long-term storage packages such as presented hereinabove, each accommodating a case containing radioactive materials, and being stored in a vertical position with said removable head cover oriented at the top.

It preferably also comprises a lift/handling of packages, the latter having a maximum height (He), said lift having a hook defining a maximum height to hook (Hsc), and the (Hsc)/(He) ratio being less than strictly 2, prohibiting transfer of a case in the vertical.

It also preferably comprises a pivoting package frame, allowing each of the storage packages to be pivoted from the horizontal position to the vertical position. Therefore, the storage packages can be loaded from their respective cases in the horizontal, then swung on the pivoting frame into the vertical storage position.

The site is preferably a long-term storage facility closed at the top, even though it could alternatively be an open-roof site, without departing from the scope of the invention.

Lastly, another object of the invention is a transfer process for a case containing radioactive materials, transfer package to long-term storage package such as that described hereinabove, the process comprising the following successive steps consisting of:

guiding each said storage package and transfer package into a horizontal position;

removing a removable head cover from said transfer package, as well as said removable base cover from said storage package;

introducing said case into said housing of the storage package, via said low end of said package body, left free by the removal of said removable base cover;

reclosing said low end of said package body, by replacing said removable base cover on said package body accommodating the case; and swinging said storage package in a vertical position, such that said package base is opposite the ground.

Other advantages and characteristics of the invention will emerge from the non-limiting detailed description hereinbelow.

BRIEF DESCRIPTION OF THE DRAWINGS

This description will be given by means of the attached diagrams, in which.

DETAILED DESCRIPTION OF PREFERRED EMBODIMENTS

Figure 1:
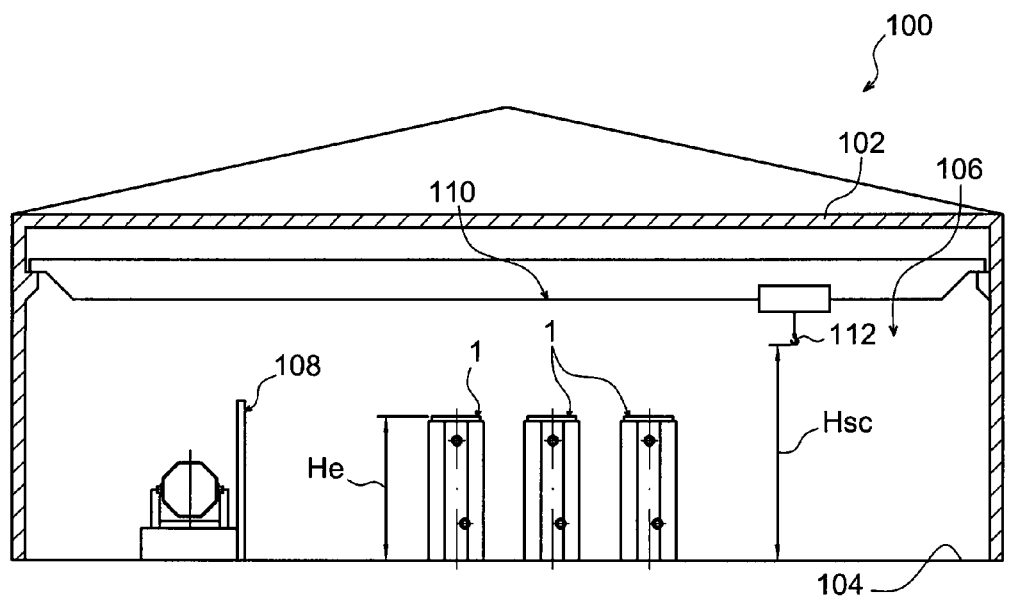
FIG. 1 illustrates a side elevation of a long-term storage site for radioactive materials, according to a preferred embodiment of this present invention.
Figure 2:
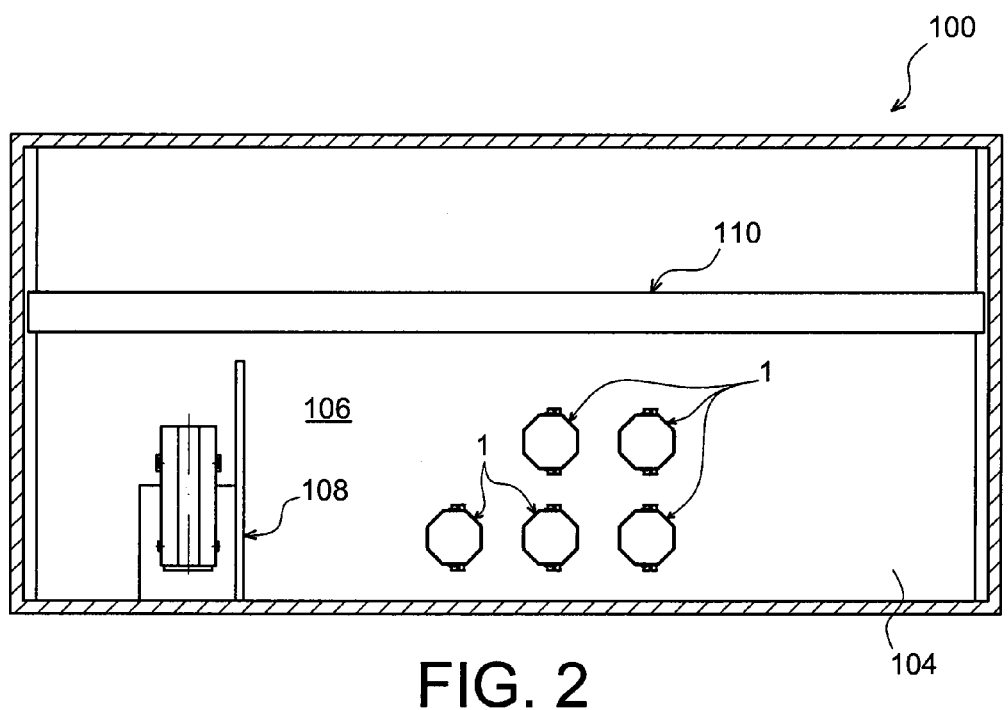
FIG. 2 illustrates a plan view of the site shown in FIG. 1.

In reference first to FIGS. 1 and 2, these show a long-term storage site 100 for radioactive materials, according to a preferred embodiment of this present invention. The site 100 is closed at the top by a ceiling 102, imparting the form of a "storage facility", in which the radioactive materials are intended to be stored over a long period of around twenty to sixty years.

The storage facility 100 has a floor or ground 104 defining a storage area on which rests vertically a plurality of elongated long-term storage packages 1, also objects of this present invention, to be detailed hereinbelow. In general, it is indicated that each of the storage packages 1 houses a case containing radioactive materials such as assemblies of irradiated nuclear fuel, the package and the case being stored in a vertical position with the removable head cover of the package and the case upper end oriented at the top, in the direction of the ceiling 102. As a guide only, the head or upper end of the case generally distinguishes from the bottom of this case by the presence of at least one inspection orifice on its cover, allowing one to check the seal of the case. In addition, the bottom of the case is usually made as a single piece with the lateral body of the case, while its head takes the form of an upper cover fixed onto this same lateral body, after insertion of the radioactive materials.

This way of vertically storing the packages 1 best optimises the overall space of the storage space 106 situated between the ground 104 and the ceiling 102, and thus maximises the number of packages 1 to be stored simultaneously in this space 106. The packages 1 are preferably and by way of indication stored in an array of parallel rows.

Additionally, the storage facility 100 is equipped with a frame 108 for pivoting the packages, allowing each of the storage packages to be pivoted from the horizontal position to the vertical position during the transfer operation of the assigned case, as will be specified hereinbelow.

In addition, the storage facility 100 comprises a mechanical lift/handling for the packages, designated 110, in particular allowing the packages 1 to be moved inside the storage space 106, while being kept in a vertical position.

Conventionally, the lift 110 has a lifting member or hook 112, defining a maximum height to lifting member, distance Hsc. Furthermore, each package 1 has a maximum height He, preferably always identical. By way of indication, this height He is considered according to the direction of the longitudinal axis of the elongated package, the latter being parallel to the vertical when the package is stored long-term in the space 106.

One of the particular features of this present invention is the fact that the ratio between the heights Hsc and He is less than strictly 2, and preferably between 1.5 and 1.9. This specificity, conferring on the storage facility a reasonable height, nevertheless translates the fact that the transfer of a case in its storage package, in the vertical inside the storage space 106, is made impossible by the excessively low height remaining above this same storage package intended to receive the case, and resting vertically on the ground 104.

To ensure transfer of the cases inside the storage facility 100, in spite of the low height free above the packages, it is provided that the latter have a particular design, specific to this present invention, which will now be explained in reference to FIGS. 3 and 4.

Figure 3:
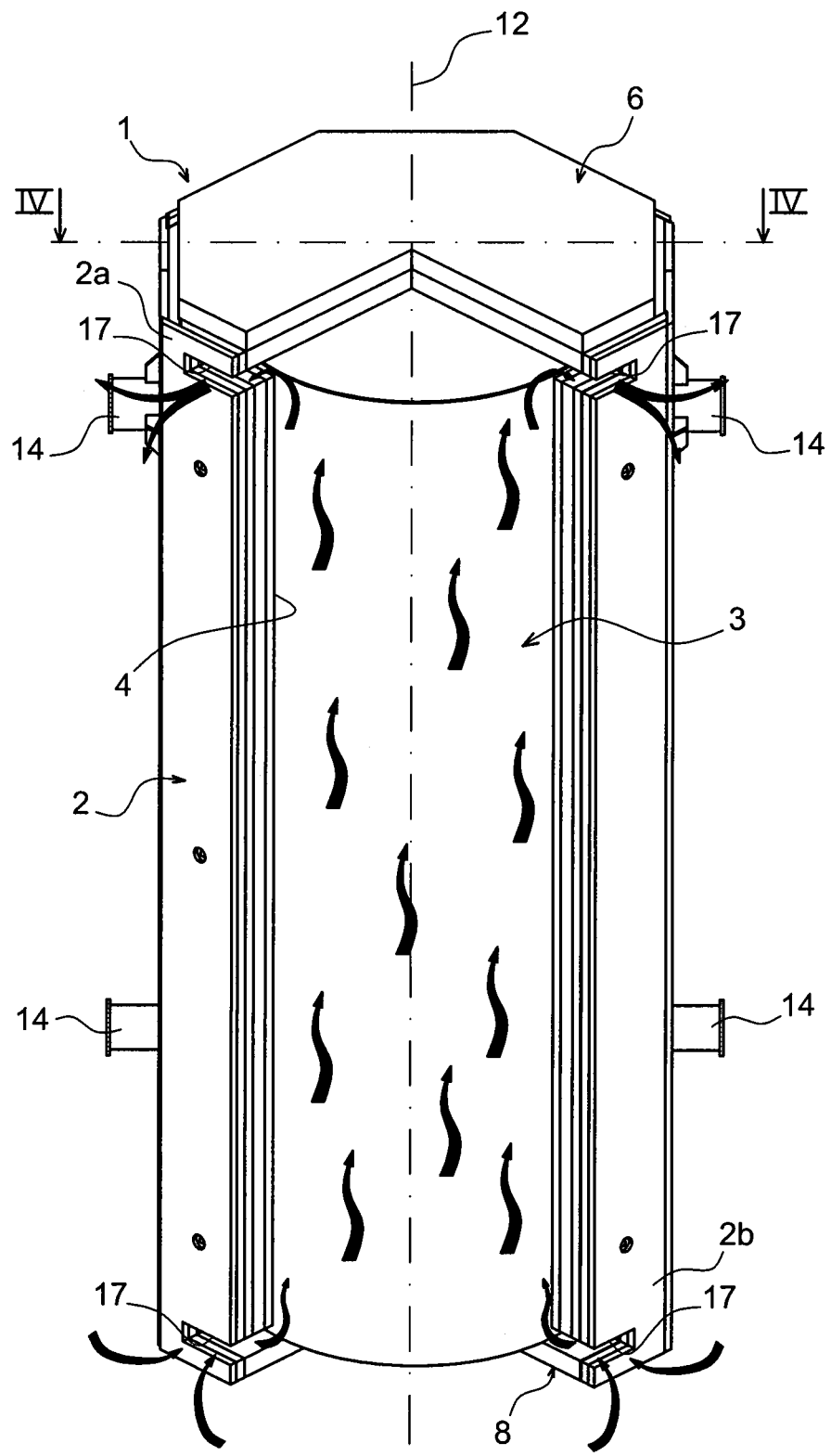
FIG. 3 illustrates a partially exploded perspective view, showing long-term storage package intended to receive a case containing radioactive materials, according to a preferred embodiment of this present invention.
Figure 4:
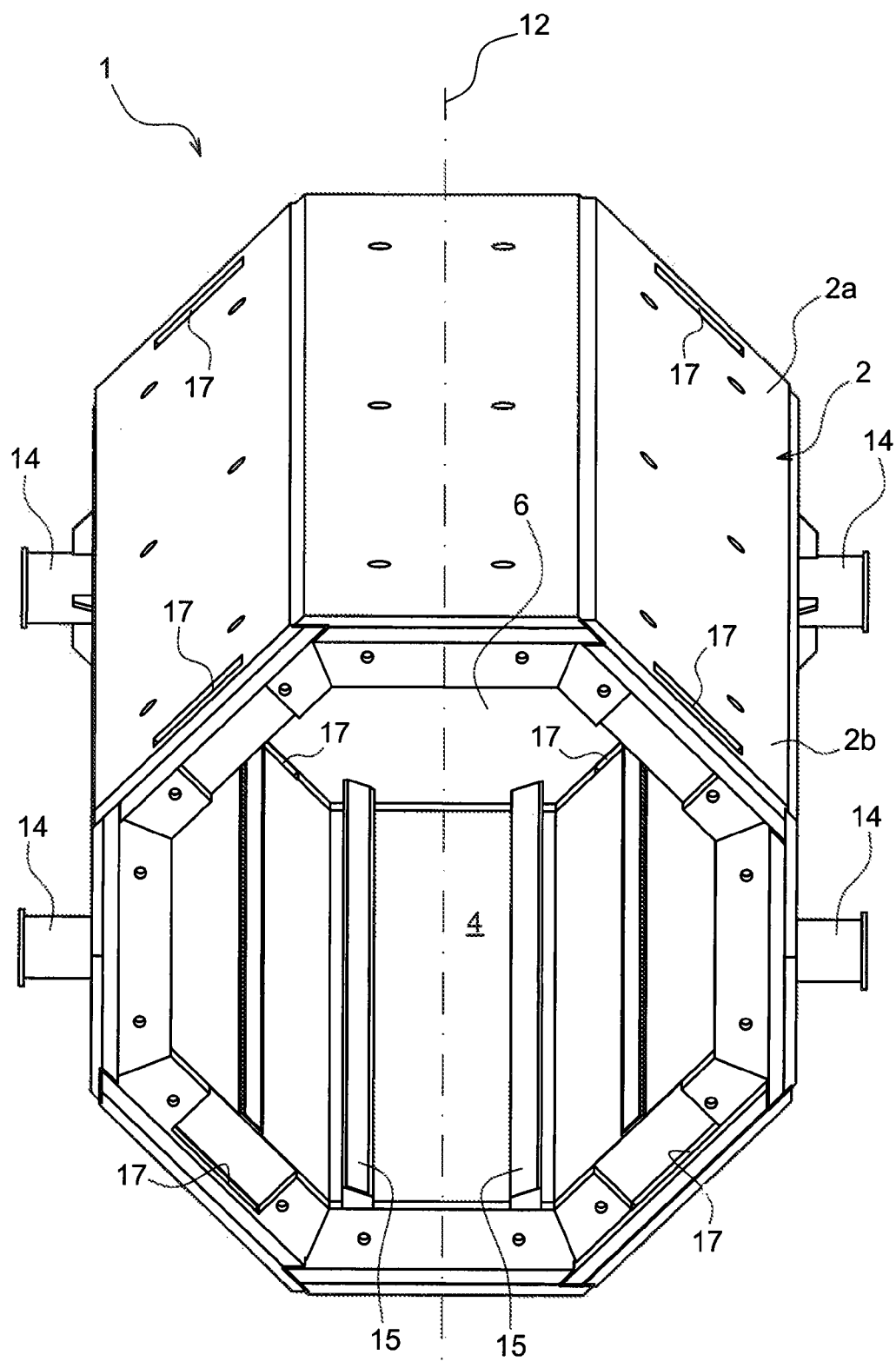
FIG. 4 illustrates a partial perspective view of the package shown in FIG. 3, with a different viewing angle, with the case and the removable bottom of the package having been removed for reasons of clarity.

In reference first of all to FIGS. 3 and 4, these illustrate long-term storage package 1 intended to receive a case 3 containing radioactive materials, this package being in the form of a preferred embodiment of this present invention.

The package 1 overall comprises a lateral hollow package body 2 of cylindrical shape and defining a package housing 4 for receiving the case 3, a removable head cover 6 closing the housing 4 at the level of a top end 2a of the body 2, as well as a package base 8 closing the housing 4 at the level of the other end of the lateral body 2, known as the low end 2b.

As is known to the specialist, in such long-term storage package, of longitudinal axis 12, the housing 4 does not constitute an enclosure for confinement of the radioactive materials, this enclosure being effectively defined by the case itself. All the same, the design of this package ensures the usual functions of neutronic protection, protection from gamma radiation, and mechanical resistance. For this, it can especially be ensured that the thickness of the hollow lateral body 2 is at least 200 mm, and made of steel.

One of the particular features of this present invention consists of ensuring that the package base 8 takes the form of a removable base cover, which is consequently assembled reversibly on the lateral body 2, for example by bolting or equivalent. As will be specified hereinbelow, during a transfer process of a case this allows the latter to be inserted via the low end 2b of the package body 2.

The package 1 further comprises a plurality of handling elements 14, also known as handling trunnions, intended to co-operate with a spreader (not illustrated) suspended on the hook 112 of the lift 110 for allowing movement of the package. There are preferably four or more of them, spaced near the high and low ends of the lateral body 2, from which they project radially to the outside.

Furthermore, the package 1 includes ventilation means used for air circulation by convection between the cavity 4 and the exterior of the package, when the latter is in the vertical position. These special means, providing air circulation, and used to collect and remove part of the heat given off by the radioactive materials contained in the case, can be created by any means known to those skilled in the art.

As a guide only, crosswise passages 17 can be created at the top and bottom ends of the package, so as to cause the exterior of the latter to communicate with the cavity 4. These crosswise passages 17 can, for example, be created at the top 2a and bottom 2b ends of the body 2, as illustrated in FIGS. 3 and 4.

Thus, as indicated by the arrows on these same figures, the outside air transits through the body of the package 2 via the crosswise passages 17 at the bottom end 2b, and then enters into a free annular space between the case 3 and the internal wall of the cavity 4.

From this moment, the air collects heat given off by the radioactive materials contained in the case, and routes upwards because of its temperature. All along its path upwards, the air adjacent to the case therefore collects heat given off by the radioactive materials, so the heat is then removed and escapes through the annular space via the crosswise passages 17 at the top end 2a. The air leaving these passages 17 is then discharged to the environment outside the package. Note that the phenomenon that has just been explained occurs in a continuous manner.

Finally, FIG. 4 in which the removable base cover has been removed, shows that the inner surface delimiting the housing 4 is equipped with means for allowing the case to slide relative to the lateral body 2 during its insertion to the housing 4, these means for example taking the form of parallel ramps/rails 15 extending according to the direction of the longitudinal axis 12, also corresponding to the slide direction of the case.

In this respect, the invention also relates to a transfer process of such a case 3 containing radioactive materials, from the transfer package to the housing 4 of a long-term storage package 1 which has just been described. By way of indication, it is noted that the transfer package can be package designed solely to ensure such transfer of the case on the same nuclear site, for example between the nuclear reactor and the long-term storage site, this package not being designed to take public roads, or more preferably transport/storage package for radioactive materials specially designed for taking public roads, as is known to the specialist.

FIGS. 5a to 5h illustrate different successive steps of a transfer process according to a preferred embodiment of this present invention.

Figure 5A:
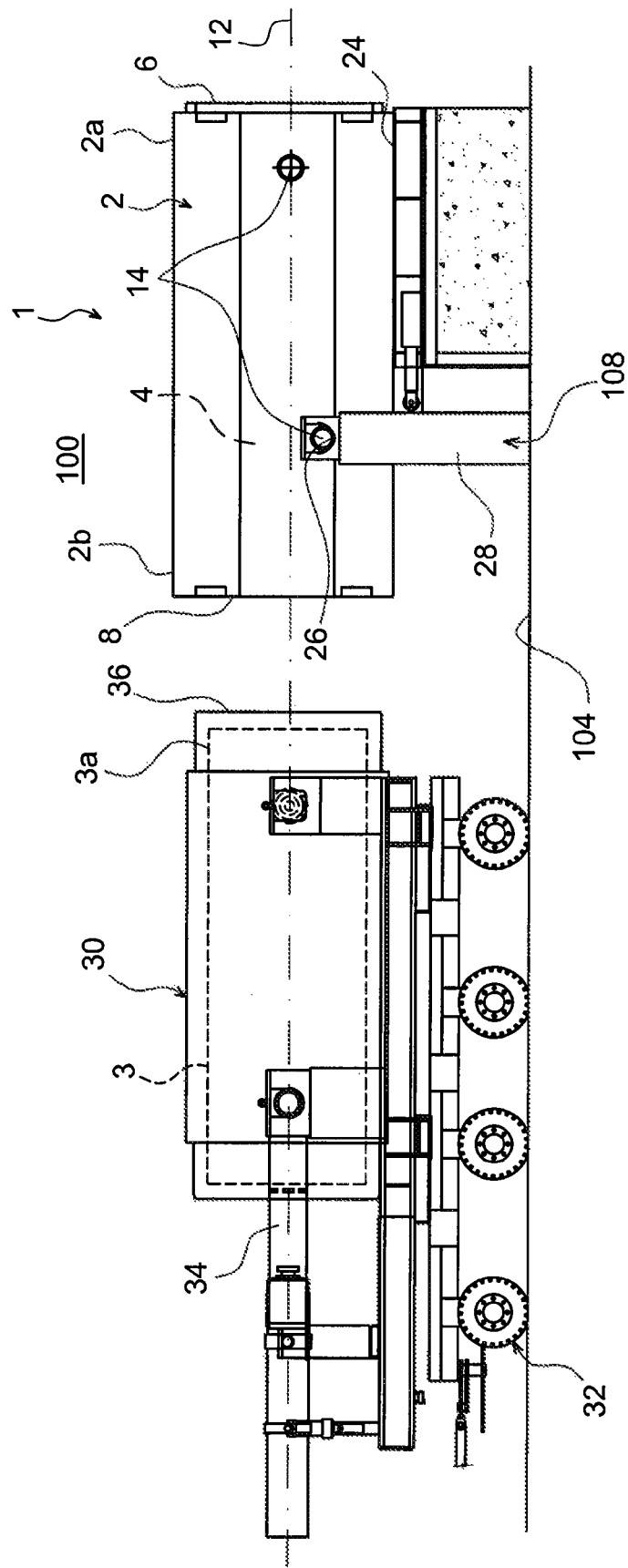
FIGS. 5a to 5h illustrate side elevations showing different successive steps of a transfer process of a case containing radioactive materials, according to a preferred embodiment of this present invention.

As is evident from FIG. 5a, the long-term storage package 1 is pending in the storage facility 100, on the pivoting frame 108, in a horizontal position. The lateral body 2 is supported on a platform 24 of the frame 108, whereas each of the two lower trunnions 14 is lodged in an open receptacle 26 defined at the upper end of a vertical pivoting arm 28 of the frame.

At this instant, the two covers 6 and 8 are mounted on the body 2, thus closing the empty housing 4.

Furthermore, transfer package 30 containing the case 3 to be transferred is guided to opposite the removable base cover 8, by means of a transport vehicle 32 on which the transfer package 30 rests horizontally, with the case top 3a oriented in the direction of the removable base cover 8. Arranging the two packages 30, 1 opposite one another and spaced apart is done such that their respective longitudinal axes 34, 12 are substantially combined, i.e. the transfer package and the storage package are guided into aligned horizontal positions, as shown in FIG. 5a.

Figure 5B:
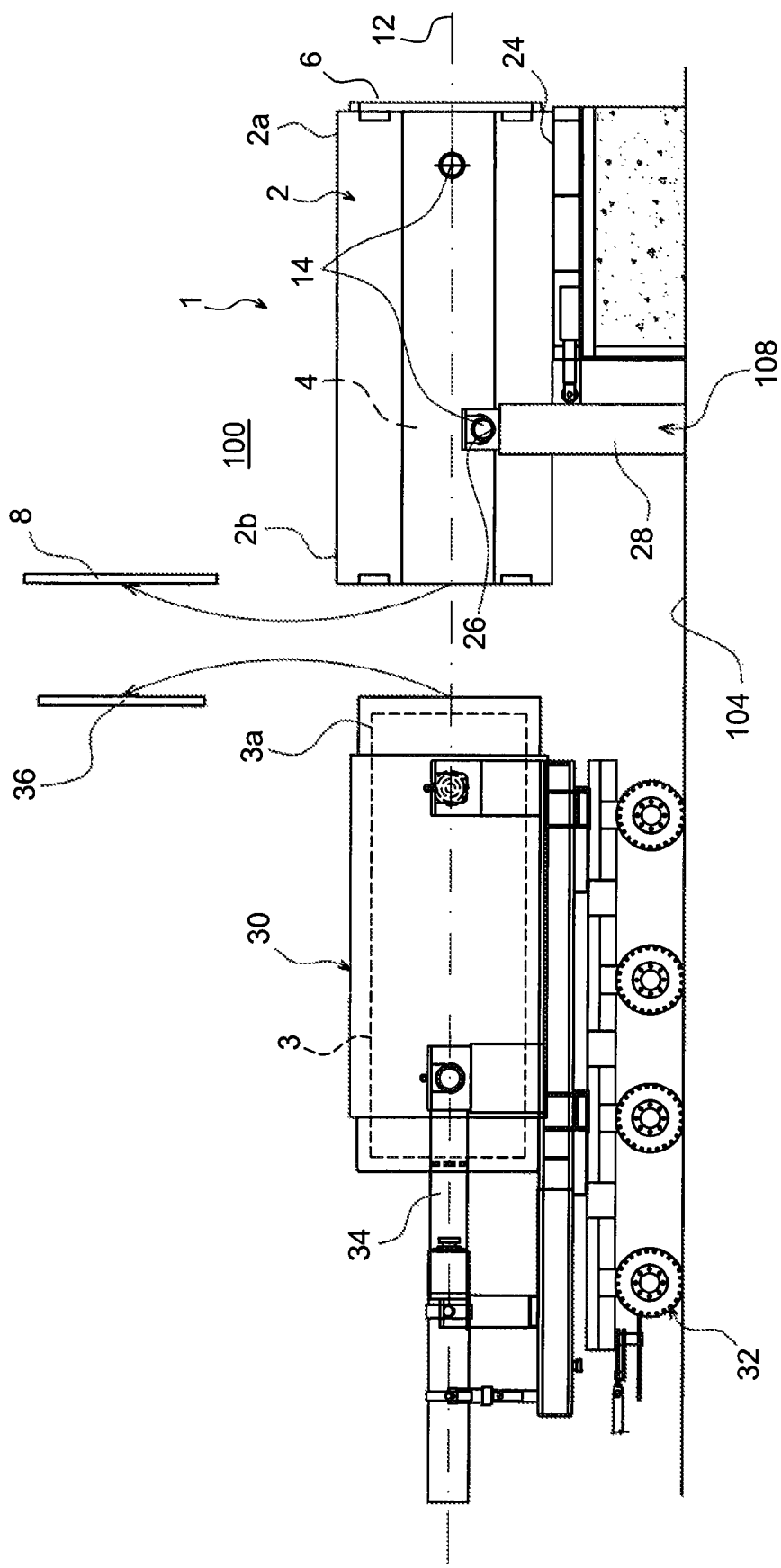

The following step shown in FIG. 5b consists of removing the removable head cover 36 from the transfer package 30, as well as removing the removable base cover 8 from the storage package 1. Next, the classic vehicle 32 known to the specialist is moved in such a way that the transfer package 30 comes alongside the storage package 1, by placing the head of the package 30 in contact with the low end 2b of the body 2 of the package 1.

Figure 5C:
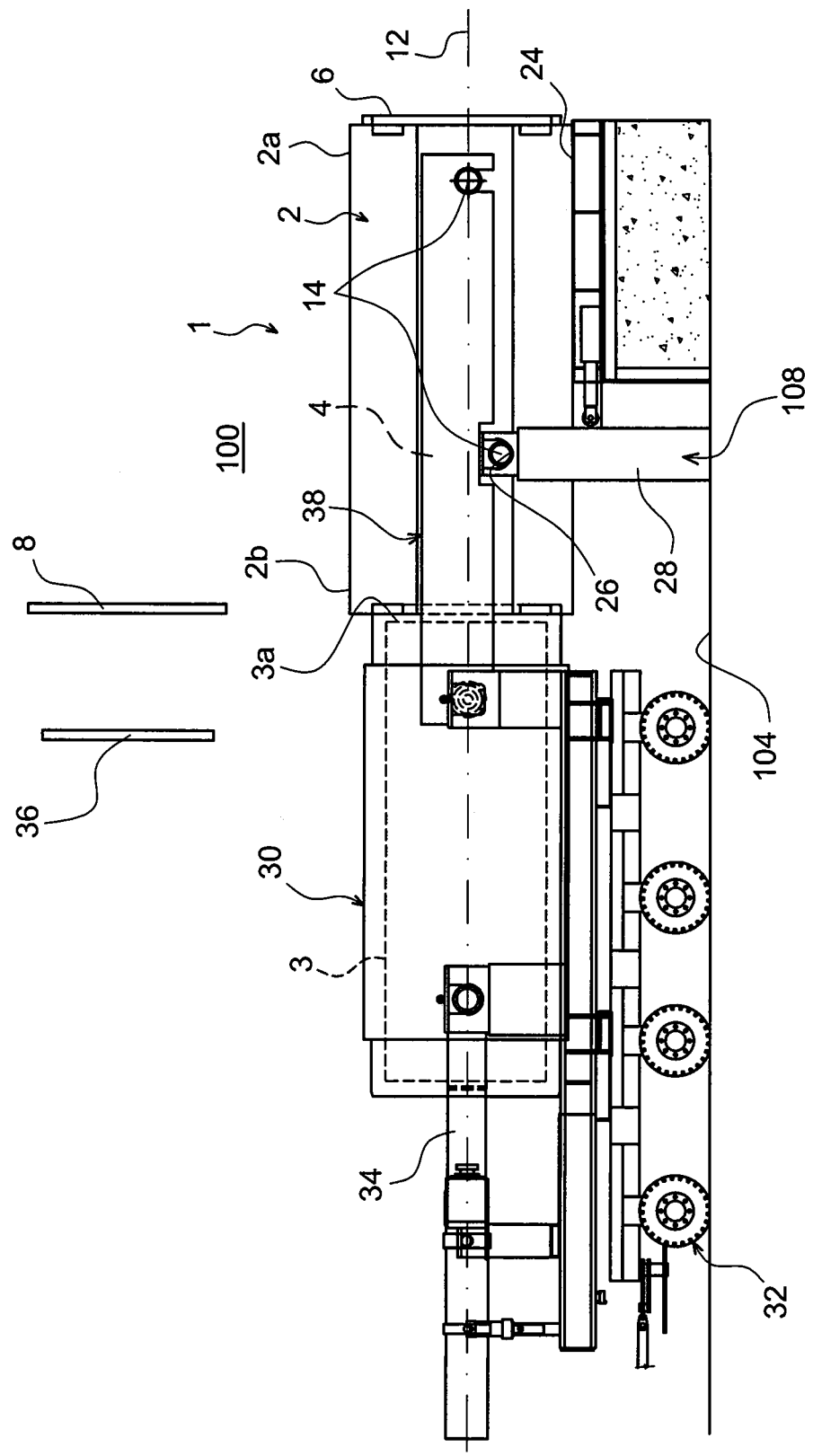

Once contact is made, the stowage can be completed by mechanically connecting the handling journals of the two packages, for example using beams 38 having notches for the housing of the journals. By way of indication and as shown in FIG. 5c, each beam 38 (one only made visible due to side elevation) can co-operate with an upper journal of the package 30, and a lower journal 14 of the package 1.

Figure 5D:
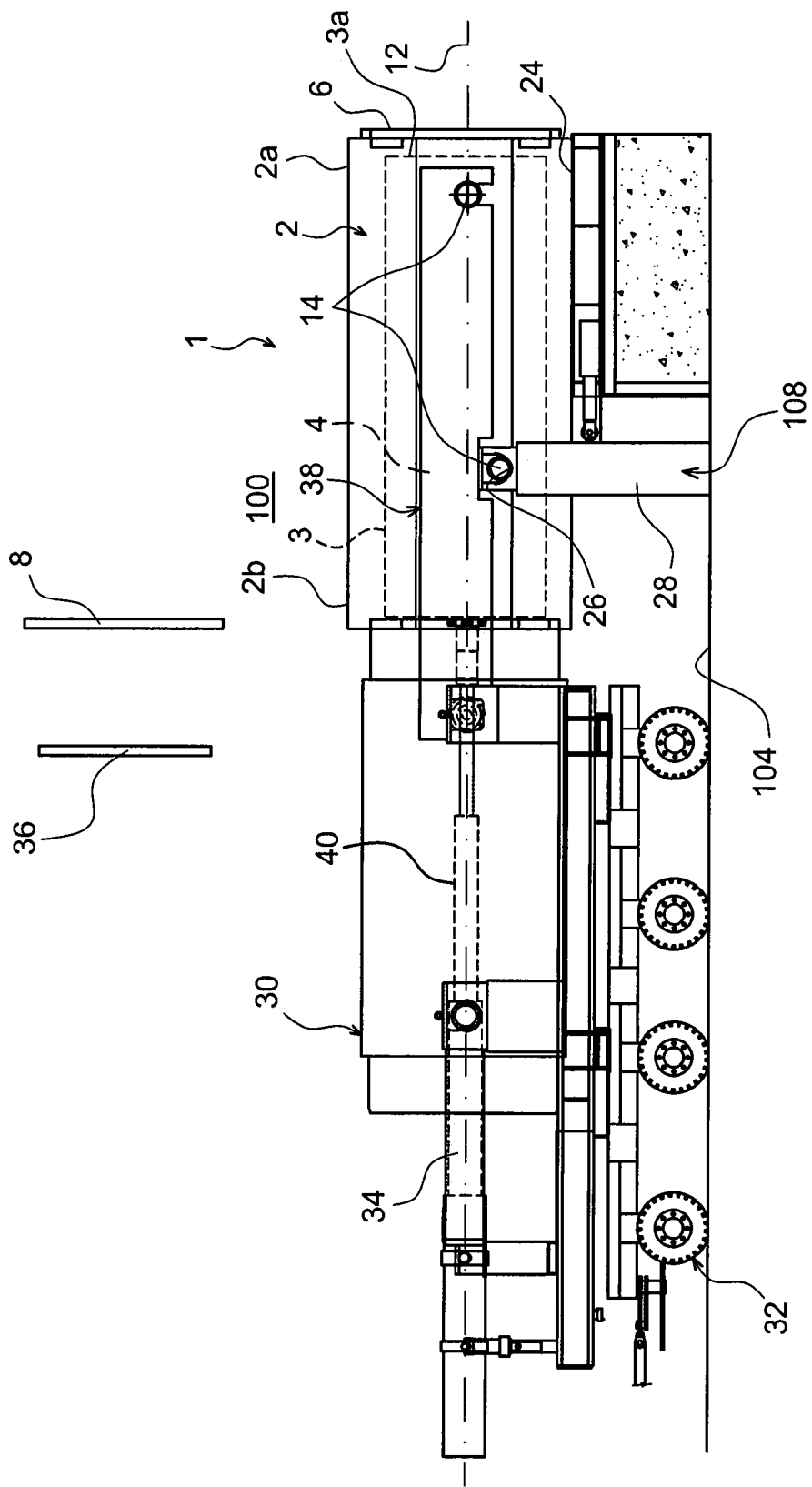

The following step consists of shifting the case 3 horizontally into the housing 4, via the low end 2b of the package body 2, left open by removal of the removable base cover 8. For this, movement means are actuated, such as a telescopic arm 40 arranged on the vehicle 32 and causing horizontal displacement by pushing the case in the direction of the longitudinal axes 12, 34. This displacement in fact induces the case 3 to penetrate progressively inside the housing 4 with its head 3a to the front, as is shown in FIG. 5d. Also, so as to move the ease still lying horizontal, the case top 3a is situated at the level of the top end 2a of the package body, opposite the removable head cover 6 remaining permanently on the package 1. By way of indication, during the horizontal movement of the case 3, its sliding inside the lateral body 2 is facilitated by the presence of the above-mentioned ramps on which it rests.

Figure 5E:
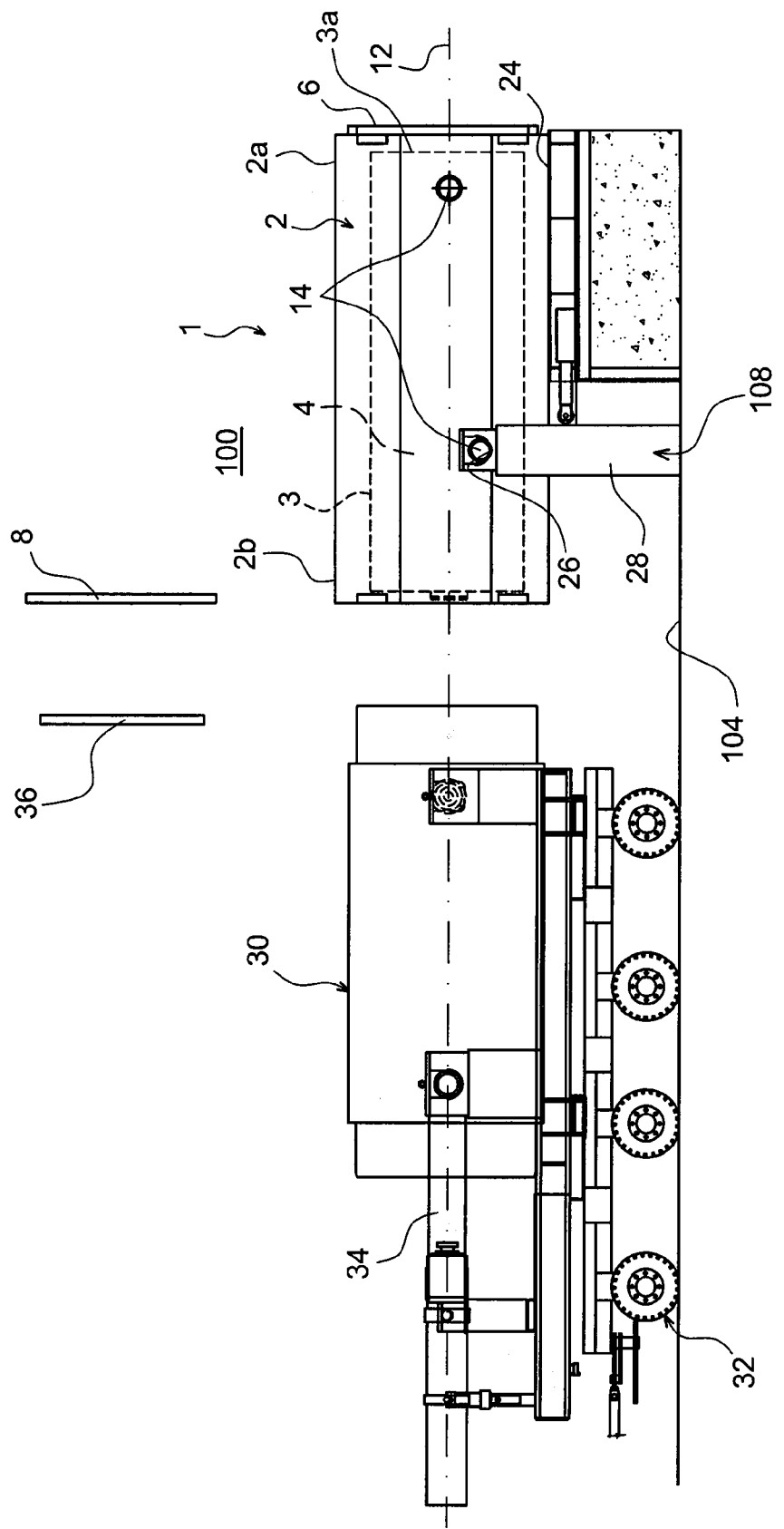

Next, stowage and coming alongside are broken off, before the vehicle 32 is backed up to remove the package 30 from the storage package 1 newly loaded with the case 3, as shown in FIG. 5e.

Figure 5F:
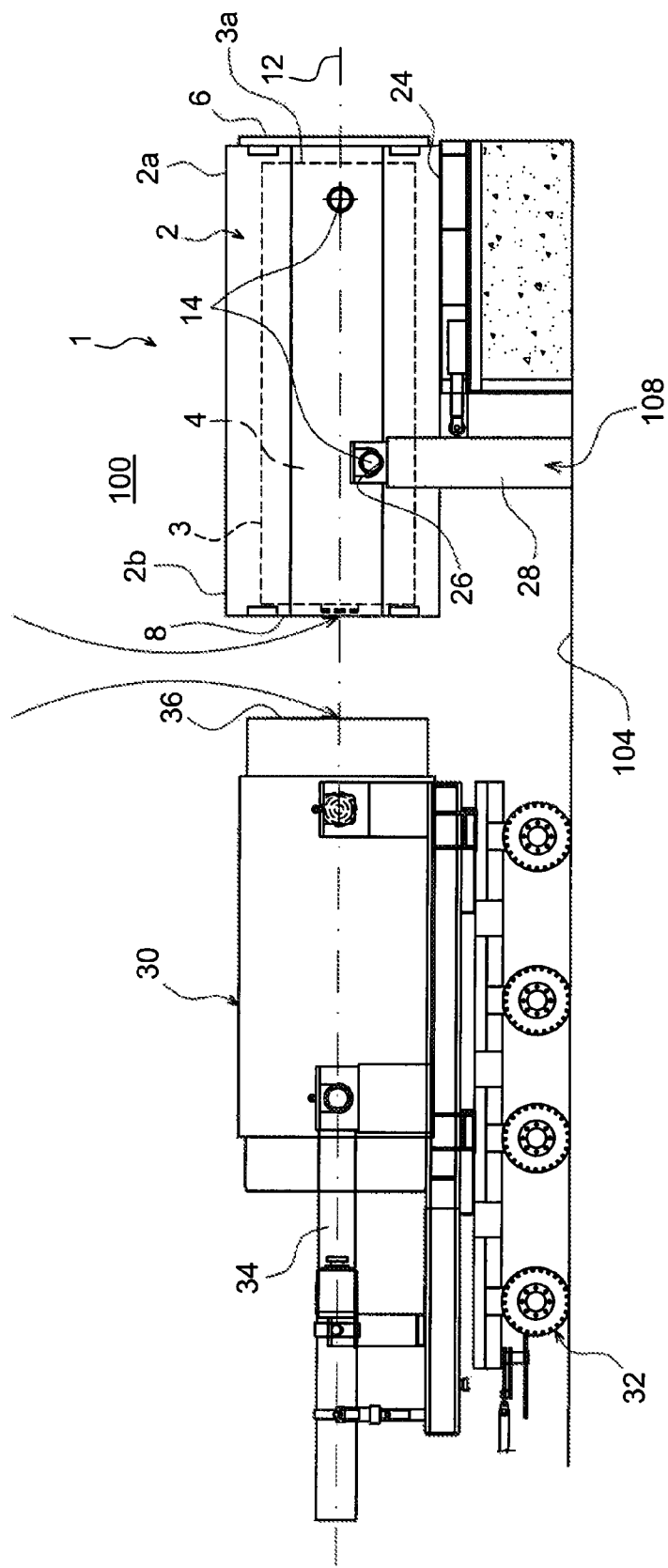

The following step consists of reclosing the low end 2b of the package body 1, by replacing the removable base cover 8 on the package body 2 accommodating the case, and reclosing the top end of the package 30, by replacing the removable head cover 36 on this same empty package 30, as shown in FIG. 5f.

Figure 5G:
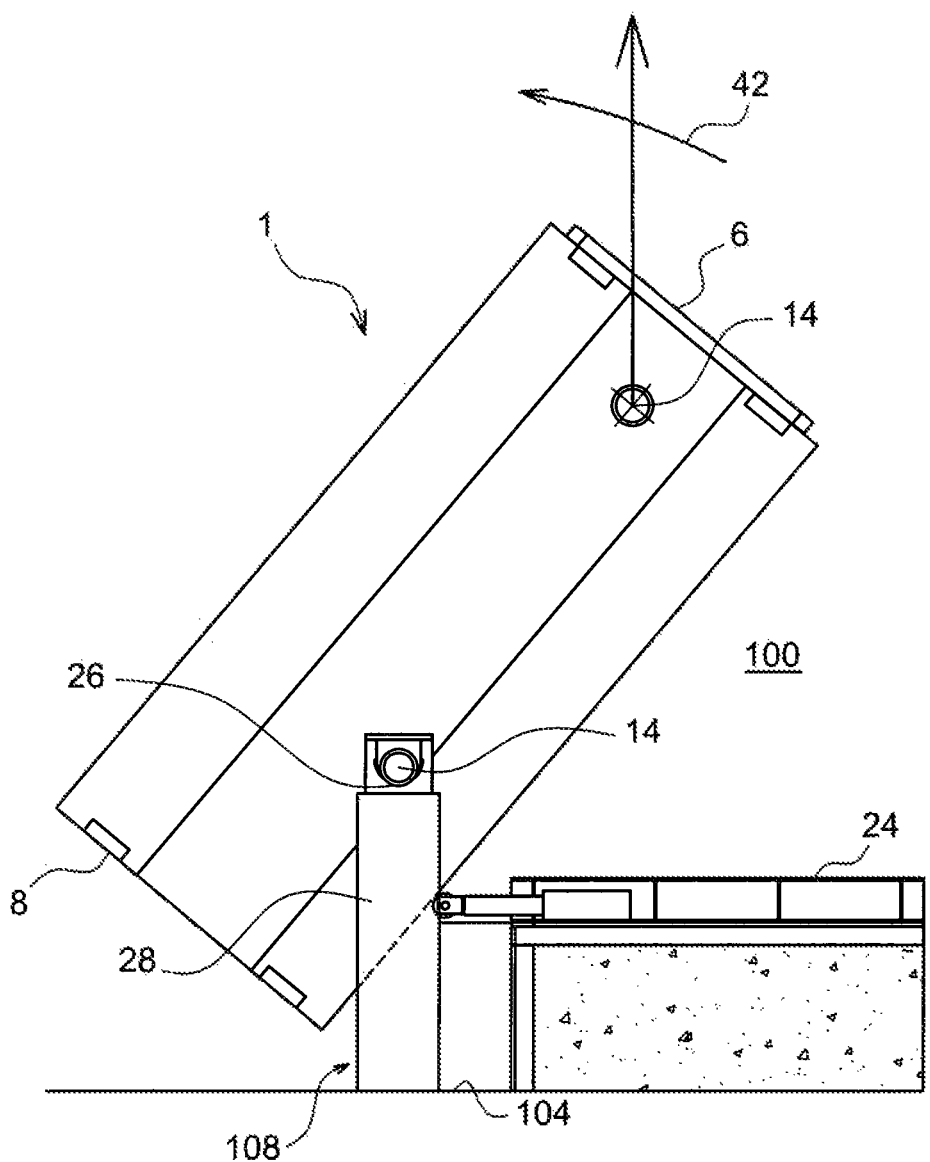
Figure 5H:
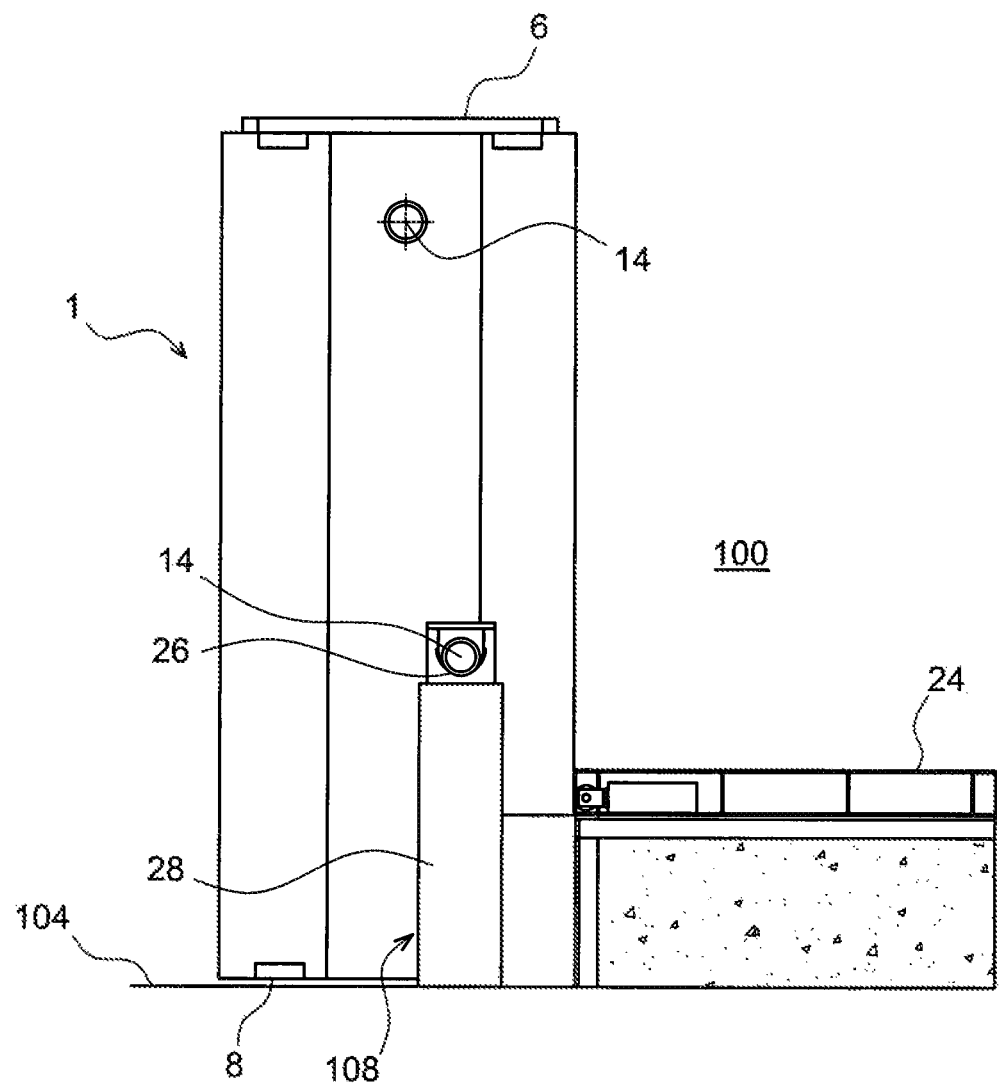

FIG. 5g shows a subsequent step consisting of rocking the storage package 1 from the horizontally oriented position to a vertically oriented position, such that the package base 8 is now opposite the ground 104 of the storage facility. To do this, the mechanical lift (not illustrated in this figure) co-operates with the upper journals 14, whereas the lower journals 14 are still lodged in their respective receptacles 26. Moving the lift allows the package 1 to pivot according to the common axis of its lower journals 14 still supported in their receptacles, as shown by arrow 42. With this pivoting movement of the package 1, its head is then progressively guided to the top, until this package adopts the vertical position as shown in FIG. 5h, in which the head cover 6 and the head of the case are oriented at the top at the same time, that is, to the ceiling of the storage facility.

The lift can then continue moving the package 1 loaded with the case, in order to guide it into its storage position inside the storage space, still keeping it suspended by its upper journals 14 ensuring movement in a vertical position.

The same transfer process can then be repeated for the following storage package, after it has been placed on the pivoting frame 108 in a horizontal position.

As a guide only, it is noted that those skilled in the art, finding themselves in the presence of a package according to the invention, are perfectly capable of making the distinction between the following elements—the top and bottom ends of the package body, and the head and bottom of the package body, even when the package is not located in the vertical storage position. In fact, each of these elements is of a design that allows those skilled in the art to recognise them, whatever the position of the package.

By way of some guidance examples, handling trunnions are provided at both the top end and bottom end of the package body. Those provided at the bottom end are generally offset in relation to the longitudinal axis of the package, so that the axis of the trunnions and the longitudinal axis of the package are not secant, as illustrated in FIGS. 1 and 5a to 5g, in order to facilitate the tilting of the latter in a favoured direction around the axes of these trunnions associated with the bottom end. On the other hand, this is not the case for the trunnions associated with the top end, of which the axes generally pass via the longitudinal axis of the package.

In addition, the package is generally provided with orifices on the upper part in order to allow the passage of cables and/or other devices in order to check the sealing of the case.

Finally, those skilled in the art can easily work out the difference between the removable cover and the removable bottom, in particular when the removable bottom is recessed into the package body in order to prevent any direct contact of the package onto this same bottom, in the vertical position, which could cause damage to the device for securing the bottom. In such a case, in order not to be adversely affected in the vertical position of the package, the bottom does not project in any way from the package body toward the exterior on the longitudinal axis. On the other hand, for its part, the cover generally does project toward the exterior on the longitudinal axis, in relation to the top end of the package body, as can be seen in FIG. 3.

It is understood that various modifications can be made by the specialist to the invention which has just been described, solely by way of non-limiting examples.

The invention claimed is:

1. A process for transfer of a case containing radioactive materials from a transfer package to a long-term storage package, which comprises:

guiding an elongated transfer package having an inner case containing radioactive materials and an elongated storage package having an interior configured for receiving the case into aligned horizontal positions, wherein the transfer package has a removable head cover, and wherein the storage package includes a body defining an interior configured for receiving the case, the storage package having a head end and a base end, the head end having a removable head cover and the base end having a removable base cover;

removing the removable head cover from the transfer package for access to the inner case, and removing the removable base cover from the base end of the storage package for access to the interior of the storage package;

thereafter, while the transfer package and the storage package are horizontally aligned, shifting the case horizontally from the transfer package, through an opening revealed by removing the removable head cover, to the interior of the storage package, through an opening revealed by removing the removable base cover;

thereafter reclosing the base end of the storage package by replacing the removable base cover on the storage package; and thereafter swinging the storage package from a horizontally oriented position to a vertically oriented position, wherein the head end is in the top vertical position and the base end is in the bottom vertical position.

2. The process of claim 1, further comprising removing the head cover of the storage package to inspect the inner case.

3. The process of claim 1, wherein the storage package includes ventilation means for circulation of air from the exterior of the storage package, along the inner case, and back to the exterior of the storage package.

4. The process of claim 1, wherein the storage package has an outer shell of a thickness of at least 200 mm.

5. A process for transfer of a case containing radioactive materials, the case having a head end and a base end, from a transfer package to a storage package, the process comprising:

obtaining the transfer package carrying the case, wherein the transfer package includes a body defining an interior compartment configured for receiving the case, and having a head end and a base end with a removable head cover at the head end, and wherein the case is horizontally oriented in the transfer package with its head end at the head end of the transfer package and its base end at the base end of the transfer package;

aligning the transfer package with the storage package for horizontal transfer of the case from the transfer package to the storage package, wherein the storage package includes a body defining an interior compartment configured for receiving the case, the storage package having a head end and a base end, the head end having a removable head cover and the base end having a removable base cover;

removing the removable head cover from the head end of the transfer package to access the interior compartment of the transfer package, and removing the removable base cover from the base end of the storage package to access the interior compartment of the storage package;

horizontally transferring the case from the transfer package through the opening revealed by removing the removable head cover of the transfer package to the interior compartment of the storage package through an opening revealed by removing the removable base cover of the storage package;

after receiving the case in the interior compartment of the storage package, closing the base end of the storage package by replacing the removable base cover on the storage package; and rotating the storage package containing the case from a horizontally oriented position to a vertically oriented position, wherein the head end is in the top vertical position and the base end is in the bottom vertical position.

6. The process of claim 5, further comprising removing the head cover of the storage package to inspect the head end of the case.

7. The process of claim 5, wherein horizontally transferring the case from the transfer package through the opening revealed by removing the removable head cover of the transfer package to the interior compartment of the storage package through an opening revealed by removing the removable base cover of the storage package includes using a telescoping arm.

8. The process of claim 5, wherein the storage package includes ventilation means for circulation of air from the exterior of the storage package, along the case, and back to the exterior of the storage package.

9. The process of claim 5, wherein the storage package has an outer shell of a thickness of at least 200 mm.

* * * * *